(12) United States Patent
Aoki et al.

(10) Patent No.: US 9,014,549 B2
(45) Date of Patent: Apr. 21, 2015

(54) DOME-TYPE CAMERA AND APERTURE CONTROL METHOD

(75) Inventors: Yohei Aoki, Fukuoka (JP); Daisuke Hara, Fukuoka (JP); Yasuji Nakamura, Fukuoka (JP); Ryoko Kato, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/821,336

(22) PCT Filed: Sep. 20, 2011

(86) PCT No.: PCT/JP2011/005275
§ 371 (c)(1),
(2), (4) Date: Mar. 7, 2013

(87) PCT Pub. No.: WO2012/046398
PCT Pub. Date: Apr. 12, 2012

(65) Prior Publication Data
US 2013/0272690 A1    Oct. 17, 2013

(30) Foreign Application Priority Data

Oct. 8, 2010   (JP) ................... 2010-228306

(51) Int. Cl.
*G03B 9/06* (2006.01)
*G03B 7/095* (2006.01)
(Continued)

(52) U.S. Cl.
CPC ............. *G03B 7/095* (2013.01); *G03B 37/02* (2013.01); *H04N 5/2251* (2013.01); *H04N 5/238* (2013.01); *H04N 5/232* (2013.01)

(58) Field of Classification Search
CPC .............. G03B 7/08; G03B 9/02; G03B 9/04; G03B 9/06; G03B 9/07; G03B 9/58; G03B 9/60; G03B 9/62
USPC .......................................... 396/257; 348/363
See application file for complete search history.

(56) References Cited

U.S. PATENT DOCUMENTS

| 4,833,534 A * | 5/1989 | Paff et al. ................ 348/151 |
| 6,707,500 B1 | 3/2004 | Tamura et al. |

(Continued)

FOREIGN PATENT DOCUMENTS

| JP | 8-256288 | 10/1996 |
| JP | 09-083841 | 3/1997 |

(Continued)

OTHER PUBLICATIONS

PCT/IB338 mailed Apr. 11, 2013.

(Continued)

*Primary Examiner* — Clayton E Laballe
*Assistant Examiner* — Fang-Chi Chang
(74) *Attorney, Agent, or Firm* — Greenblum & Bernstein, P.L.C.

(57) ABSTRACT

A dome-type camera includes a camera lens capable of rotating in a tilt direction, a dome cover for covering the camera lens, and an aperture control unit for controlling the amount of aperture of the camera lens. The amount of aperture is set to become smaller from an open value toward a closed value in accordance with the tilt angle of the camera lens becoming smaller from a zenith direction of the dome cover toward a horizontal direction. According to this dome-type camera, a desirable low tilt angle image with a reduced blur may be obtained even with a megapixel dome camera.

6 Claims, 7 Drawing Sheets

(51) Int. Cl.
*G03B 37/02* (2006.01)
*H04N 5/225* (2006.01)
*H04N 5/238* (2006.01)
*H04N 5/232* (2006.01)

(56) References Cited

U.S. PATENT DOCUMENTS

2006/0244859 A1  11/2006  Ji et al.
2009/0303325 A1  12/2009  Mizuno
2013/0223834 A1* 8/2013  Jikihara et al. ............... 396/448

FOREIGN PATENT DOCUMENTS

| JP | 2004-320526 | 11/2004 |
|---|---|---|
| JP | 2005-234446 | 9/2005 |
| JP | 2005-300659 | 10/2005 |
| JP | 2006-301638 | 11/2006 |
| JP | 2009-003010 | 1/2009 |
| JP | 2009-302943 | 12/2009 |
| JP | 2010-008498 | 1/2010 |
| JP | 2010-048841 | 3/2010 |
| JP | 2010-107772 | 5/2010 |

OTHER PUBLICATIONS

Japan Office action, mail date is May 20, 2014.
"Aperture", Wikipedia, XP055075706, URL:http://en.wikipedia.org/wiki/Aperture, Aug. 20, 2013.
Search report from E.P.O., mail date is Aug. 28, 2013.

* cited by examiner

FIG.7

DOME-TYPE CAMERA AND APERTURE CONTROL METHOD

TECHNICAL FIELD

The present invention relates to a technology for improving the image quality of a dome-type camera.

BACKGROUND ART

Conventionally, with a dome-type camera, it is known that a slight difference occurs in optical path lengths of light passing through a dome cover due to subtle unevenness in the thickness of the dome cover, resulting in increased aberration, which then causes a slight blur in an image captured by a camera lens (for example, see Patent Literature 1). This blur is more noticeable in a low tilt angle image (an image obtained by capturing the horizontal direction of the dome cover), but a conventional dome-type camera is of an image quality of a VGA (640×480 pixels) class and the image quality of such a conventional dome-type camera is not so high, and thus, a slight blur is not considered a problem.

However, in recent years, the image quality of a dome-type camera is ever more improved, and a dome-type camera of an image quality of a megapixel (1280×960 pixels) class (also referred to as a megapixel dome camera) is being developed. With such a megapixel dome camera, a slight blur, which would not be a problem with a conventional VGA dome camera, is an issue of image quality deterioration. Thus, conventionally, development of a technology for improving the image quality of a megapixel dome camera is desired.

CITATION LIST

Patent Literature

Patent Literature 1: Japanese Patent Application Laid-Open No. 2005-300659

SUMMARY OF INVENTION

Technical Problem

The present invention is made in view of the background described above, and the object of the present invention is to provide a dome-type camera capable of obtaining a high-quality image even with a megapixel dome camera.

Solution to Problem

One aspect of the present invention is a dome-type camera. This dome-type camera includes a camera lens capable of rotating in a tilt direction, a dome cover for covering the camera lens, and an aperture control unit for controlling an amount of aperture of the camera lens, where a first reference value used as a reference for the amount of aperture is set to become smaller from an open value toward a closed value in accordance with an angle of the camera lens in the tilt direction becoming smaller from a zenith direction of the dome cover toward a horizontal direction.

Another aspect of the present invention is an aperture control method. This aperture control method is used by a dome-type camera including a camera lens capable of rotating in a tilt direction, a dome cover for covering the camera lens, and an aperture control unit for controlling an amount of aperture of the camera lens, and includes detecting an angle of the camera lens in the tilt direction, and controlling the amount of aperture to become smaller from an open value toward a closed value in accordance with the angle in the tilt direction becoming smaller from a zenith direction of the dome cover toward a horizontal direction.

As will be described below, the present invention includes other aspects. Thus, the disclosure of the invention intends to provide an aspect of a part of the present invention, and does not intend to limit the scope of the invention described and claimed herein.

DESCRIPTION OF EMBODIMENTS

A detailed description of the present invention is given below. However, the detailed description and the appended drawings do not limit the invention. A dome-type camera includes aperture control, but this function may be realized by a program stored in a memory or the like of the dome-type camera.

The dome-type camera of the present invention is a dome-type camera including a camera lens rotatable in a tilt direction, a dome cover for covering the camera lens, and an aperture control unit for controlling the amount of aperture of the camera lens, and is structured such that a first reference value used as a reference for the amount of aperture is set to become smaller from an open value toward a closed value in accordance with the angle of the camera lens in the tilt direction becoming smaller from a zenith direction of the dome cover toward a horizontal direction.

According to this structure, control is performed such that when the angle of the camera lens of the dome-type camera in the tilt direction (the tilt angle) becomes small, the amount of aperture of the camera lens also becomes small. When the tilt angle becomes small, a blur due to the unevenness in the thickness of the dome cover becomes more noticeable, but in this case, the blur can be reduced by reducing the amount of aperture of the camera lens to reduce the aberration. In this manner, a desirable low tilt angle image with a reduced blur may be obtained even with a megapixel dome camera.

Moreover, the dome-type camera of the present invention may further include a zoom control unit for controlling the zoom factor of the camera lens, and may be structured such that a second reference value used as a reference for the amount of aperture is set to become smaller from an open value toward a closed value in accordance with the increase in the zoom factor, and such that the amount of aperture is set using the first reference value and the second reference value.

According to this structure, control is performed such that when the zoom factor of the camera lens of the dome-type camera is increased, the amount of aperture of the camera lens is accordingly reduced. When the zoom factor is increased, a blur due to the unevenness in the thickness of the dome cover becomes more noticeable, but in this case, the blur can be reduced by reducing the amount of aperture of the camera lens to reduce the aberration. In this manner, a desirable low tilt angle image with a reduced blur may be obtained even with a megapixel dome camera. For example, the amount of aperture can be prevented from becoming excessively small by setting the amount of aperture of the camera lens to the smaller of the first reference value set based on the tilt angle and the second reference value set based on the zoom factor.

Also, the dome-type camera of the present invention may further include an illuminance measurement unit for measuring the illuminance of light entering the camera lens, and may be structured such that a third reference value used as a reference for the amount of aperture is set to become greater from the closed value toward the open value in accordance with a decrease in the illuminance, and such that a value set using the first reference value and the second reference value is compared with the third reference value, and the amount of aperture is set to the greater of the values.

According to this structure, control is performed such that when the illuminance of light entering the camera lens becomes low, the amount of aperture of the camera lens is accordingly increased. The amount of aperture can thereby be prevented from becoming excessively small. Accordingly, a high-sensitivity image can be obtained even in a low-illumination image-capturing environment (a dark image-capturing environment).

Furthermore, according to the dome-type camera of the present invention, the optical axis of the camera lens may be enabled to be offset from the center position of the dome cover in the zenith direction, and the amount of offset of the camera lens may be set to become greater from the center position of the dome cover toward the zenith direction in accordance with the angle in the tilt direction becoming smaller from the zenith direction of the dome cover toward the horizontal direction.

According to this structure, when the angle of the camera lens of the dome-type camera in the tilt direction (the tilt angle) becomes small, the amount of offset of the camera lens accordingly becomes small. Therefore, a low tilt angle image whose perimeter is not darkened can be obtained.

An aperture control method of the present invention is an aperture control method used by a dome-type camera including a camera lens capable of rotation in a tilt direction, a dome cover for covering the camera lens, and an aperture control unit for controlling the amount of aperture of the camera lens, the aperture control method detecting the angle of the camera lens in the tilt direction, and controlling the amount of aperture to become smaller from an open value toward a closed value in accordance with the angle in the tilt direction becoming smaller from a zenith direction of the dome cover toward a horizontal direction.

Also with this method, in the same manner as described above, at the time of the tilt angle becoming smaller, the blur can be reduced by reducing the amount of aperture of the camera lens and reducing the aberration. Accordingly, a desirable low tilt angle image with a reduced blur may be obtained even with a megapixel dome camera.

According to the present invention, a desirable low tilt angle image with a reduced blur may be obtained even with a megapixel dome camera.

Embodiment

Hereinafter, a dome-type camera of an embodiment of the present invention will be described using the drawings. In the present embodiment, a dome-type camera which is of a high image quality of a megapixel (1280×960 pixels) class and which is used as a surveillance camera or the like will be described as an example.

Figure 1:
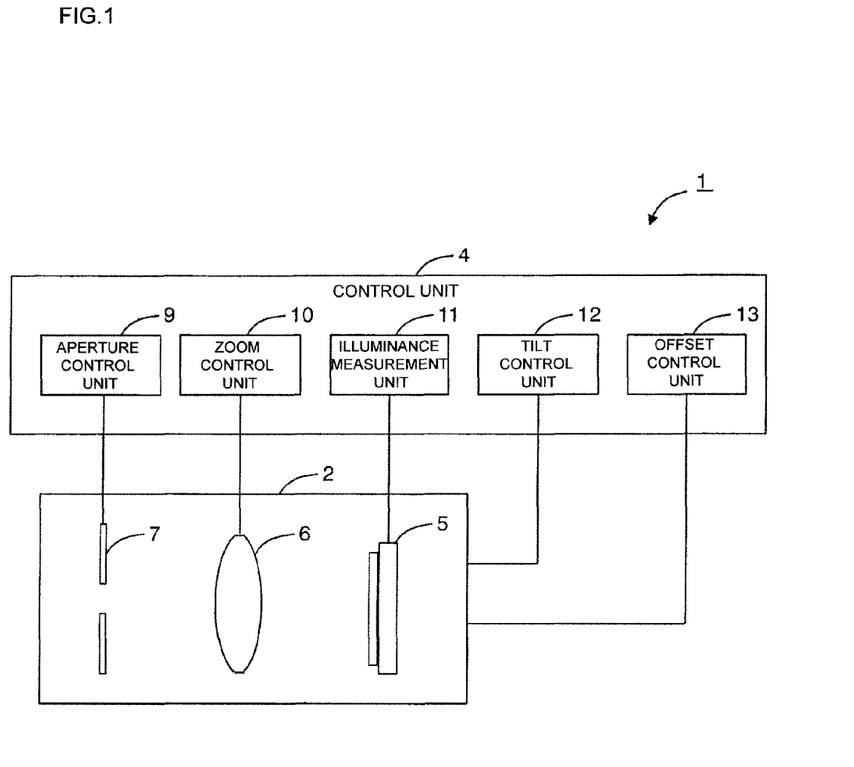
FIG. 1 is a block diagram of a dome-type camera according to an embodiment of the present invention.
Figure 2:
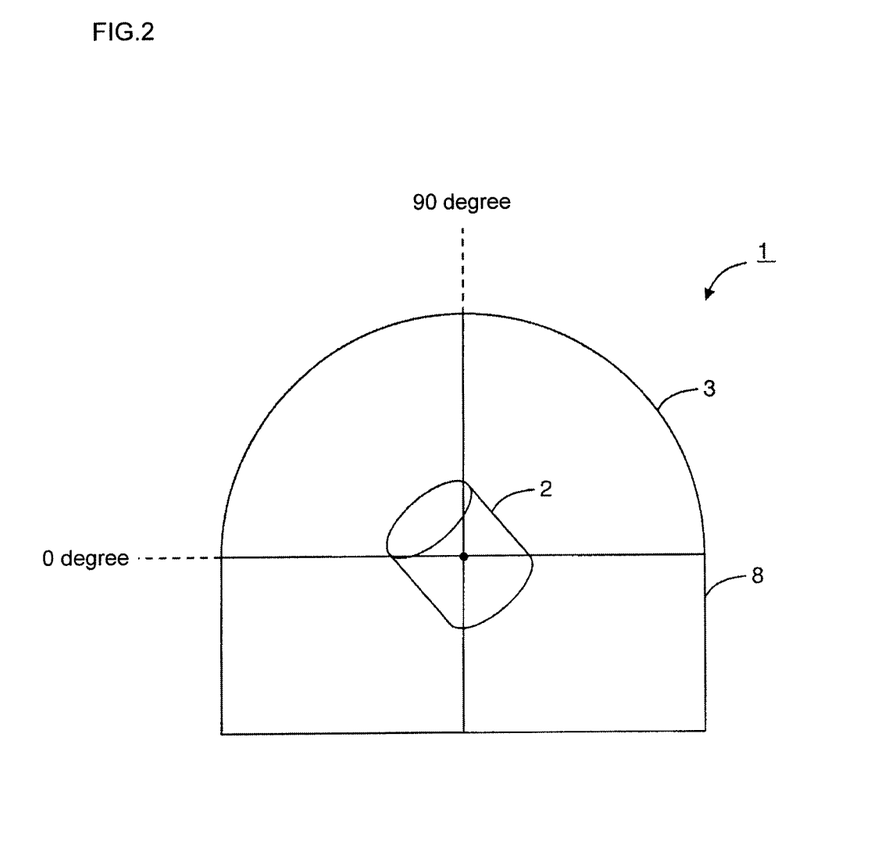
FIG. 2 is a schematic diagram of the dome-type camera (at a high tilt angle) according to the embodiment of the present invention.
Figure 3:
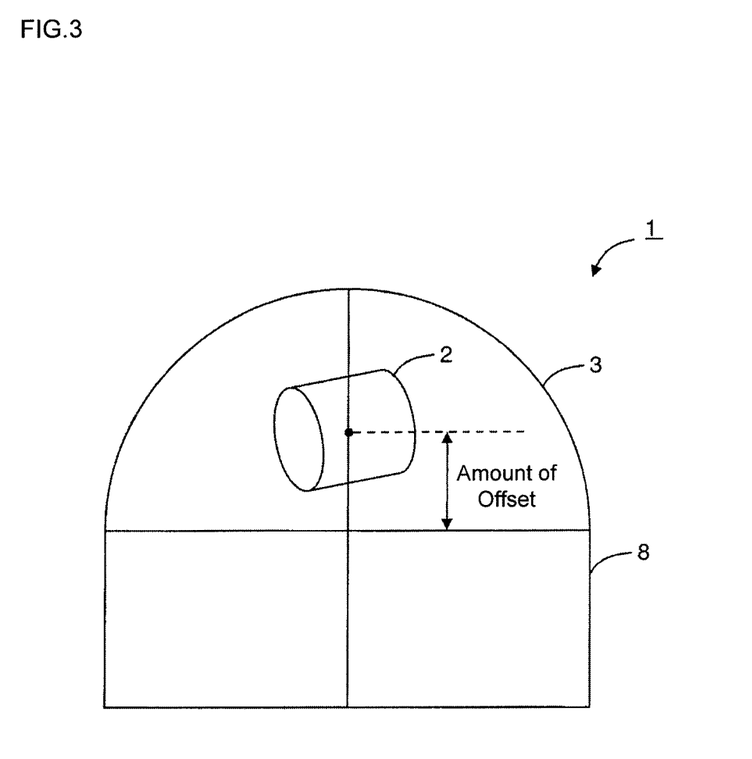
FIG. 3 is a schematic diagram of the dome-type camera (at a low tilt angle) according to the embodiment of the present invention.

A structure of the dome-type camera of the embodiment of the present invention will be described with reference to the drawings. FIG. 1 is a block diagram showing main structures of the dome-type camera of the present embodiment. FIGS. 2 and 3 are schematic diagrams showing the dome-type camera in a simplified manner. As shown in FIGS. 1 to 3, a dome-type camera 1 includes a lens unit 2 capable of rotating in a pan direction and a tilt direction, a dome cover 3 covering the lens unit 2, and a control unit 4 configured from a CPU, a microcontroller or the like.

As shown in FIG. 1, the lens unit 2 includes an image sensor 5 such as a CCD or a CMOS, a camera lens 6 arranged on the front side (on the left side in FIG. 1) of the image sensor 5, and an aperture mechanism 7 arranged on the optical path of the camera lens 6. Also, although not shown in the drawing, the lens unit 2 includes a pan tilt mechanism for rotating the lens unit 2 in the pan direction and the tilt direction, and an offset mechanism for offsetting the lens unit 2 in the zenith direction of the dome cover 3.

As shown in FIGS. 2 and 3, the dome cover 3 is attached to a base portion 8 while covering the lens unit 2. The dome cover 3 is made of transparent plastic such as polycarbonate, and has sufficient strength and light resistance. The form of the dome cover 3 is a hemisphere, and the center (the spherical center) of the dome cover 3 and the optical axis are coincident. When it is not offset, the lens unit 2 is arranged at the center of the dome cover 3 (see FIG. 2). When it is offset, the lens unit 2 is shifted from the center position of the dome cover 3 in the zenith direction (see FIG. 3). Herein, the amount of shift (the amount of shift from the center position) is called the amount of offset.

The angle of the camera lens 6 in the tilt direction (the tilt angle) is the angle formed by the horizontal direction of the dome cover 3 and the optical axis of the camera lens 6. Accordingly, when the lens unit 2 (the camera lens 6) is pointed in the horizontal direction, the tilt angle is 0 degrees, and when the lens unit 2 (the camera lens 6) is pointed in the zenith direction, the tilt angle is 90 degrees (see FIG. 2).

As shown in FIG. 1, the control unit 4 includes an aperture control unit 9 for controlling the amount of aperture of the camera lens 6, a zoom control unit 10 for controlling the zoom factor of the camera lens 6, and an illuminance measurement unit 11 for measuring the illuminance of light entering the camera lens 6. The aperture control unit 9 serves the function of controlling the amount of aperture of the camera lens 6 by adjusting the amount of aperture of the aperture mechanism 7. The zoom control unit 10 serves the function of controlling the zoom factor of the camera lens 6 by moving the camera lens 6 to the front or the back along the optical axis direction. The illuminance measurement unit 11 serves the function of measuring illuminance based on an output signal from the image sensor 5.

Also, the control unit 4 includes a tilt control unit 12 for controlling the rotation of the lens unit 2 in the tilt direction, and an offset control unit 13 for controlling the offset movement of the lens unit 2 in the zenith direction. The tilt control unit 12 serves the function of rotating the lens unit 2 in the tilt direction by controlling the pan tilt mechanism. The offset control unit 13 serves the function of offsetting the lens unit 2 in the zenith direction of the dome cover 3 by controlling the offset mechanism.

An operation of the dome-type camera 1 structured as above will be described with reference to the drawings.

Here, first, control of the amount of aperture which is a characteristic operation of the dome-type camera 1 of the present embodiment will be described. Setting of the amount of aperture is performed based on three reference values (a first reference value, a second reference value and a third reference value).

Figure 4:
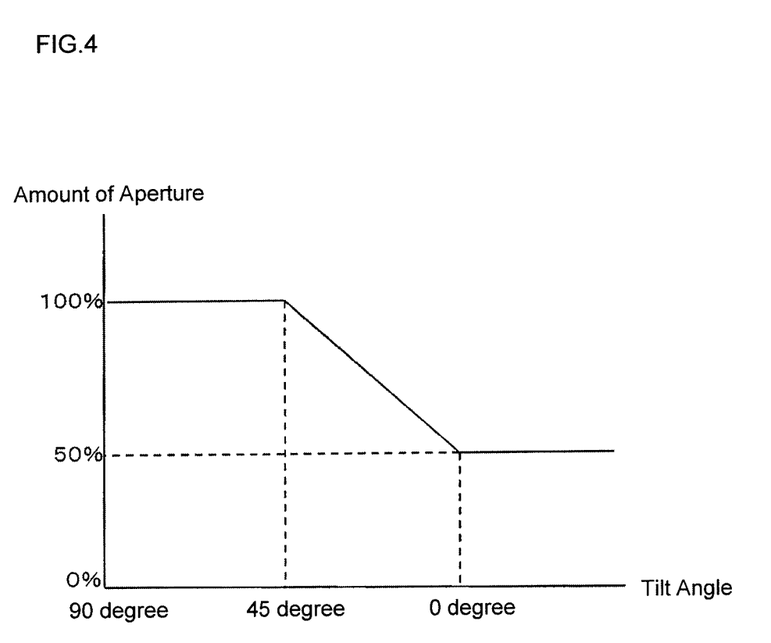
FIG. 4 is a diagram showing a relationship between a tilt angle and the amount of aperture (a first reference value) according to the embodiment of the present invention.

The first reference value for the amount of aperture is set based on the tilt angle of the lens unit 2 (the tilt angle of the camera lens 6). The tilt angle is detected by the tilt control unit 12. FIG. 4 is a diagram showing a relationship between the tilt angle and the first reference value for the amount of aperture. As shown in FIG. 4, the first reference value for the amount of aperture is set to become smaller from an open value (100%) toward a closed value (0%) as the tilt angle becomes smaller. For example, in the example in FIG. 4, the amount of aperture is set to 100% when the tilt angle is between 90 degrees and 45 degrees, the amount of aperture is set to gradually decrease from 100% to 50% when the tilt angle is between 45 degrees and 0 degrees, and the amount of aperture is set to 50% when the tilt angle is smaller than 0 degrees. Additionally, an example is described here where the amount of aperture decreases in a range where the tilt angle is between 45 degrees and 0 degrees, but the range of the tilt angle (the range of the tilt angle where the amount of aperture is decreased) is not limited thereto. Also, in the example in FIG. 4, a case is shown where the amount of aperture linearly (in a linear function manner) changes from 100% to 50% between 45 degrees and 0 degrees of the tilt angle, but the way the amount of aperture changes is not limited thereto.

Figure 5:
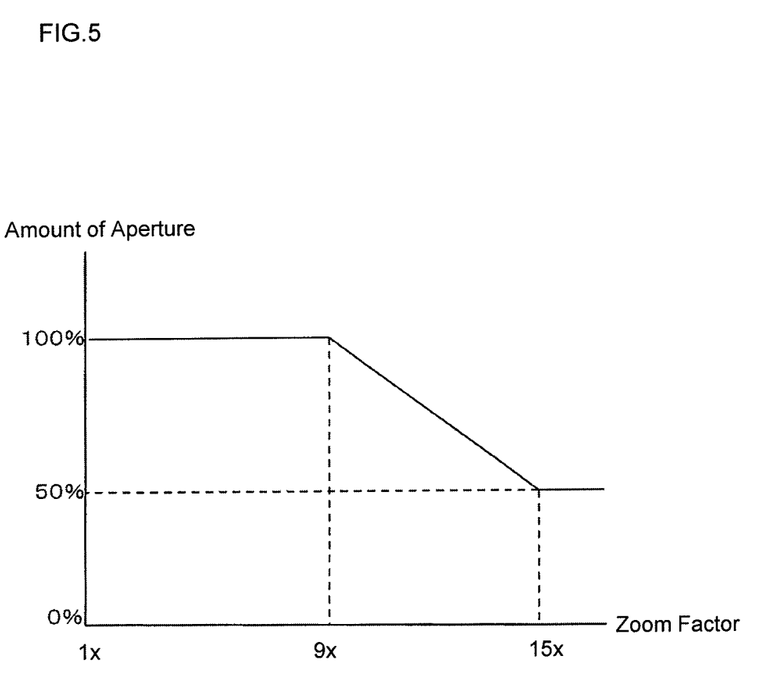
FIG. 5 is a diagram showing a relationship between a zoom factor and the amount of aperture (a second reference value) according to the embodiment of the present invention.

The second reference value for the amount of aperture is set based on the zoom factor of the camera lens 6. The zoom factor is detected by the zoom control unit 10. FIG. 5 is a diagram showing a relationship between the zoom factor and the second reference value for the amount of aperture. As shown in FIG. 5, the second reference value for the amount of aperture is set to become smaller from an open value (100%) toward a closed value (0%) as the zoom factor increases. For example, in the example in FIG. 5, the amount of aperture is set to 100% when the zoom factor is between 1 and 9, the amount of aperture is set to gradually decrease from 100% to 50% when the zoom factor is between 9 and 15, and the amount of aperture is set to 50% when the zoom factor is greater than 15. Additionally, an example is described here where the amount of aperture decreases in a range where the zoom factor is between 1 and 9, but the range of the zoom factor (the range of the zoom factor where the amount of aperture is decreased) is not limited thereto. Also, in the example in FIG. 5, a case is shown where the amount of aperture linearly (in a linear function manner) changes from 100% to 50% when the zoom factor is between 1 and 9, but the way the amount of aperture changes is not limited thereto.

Figure 6:
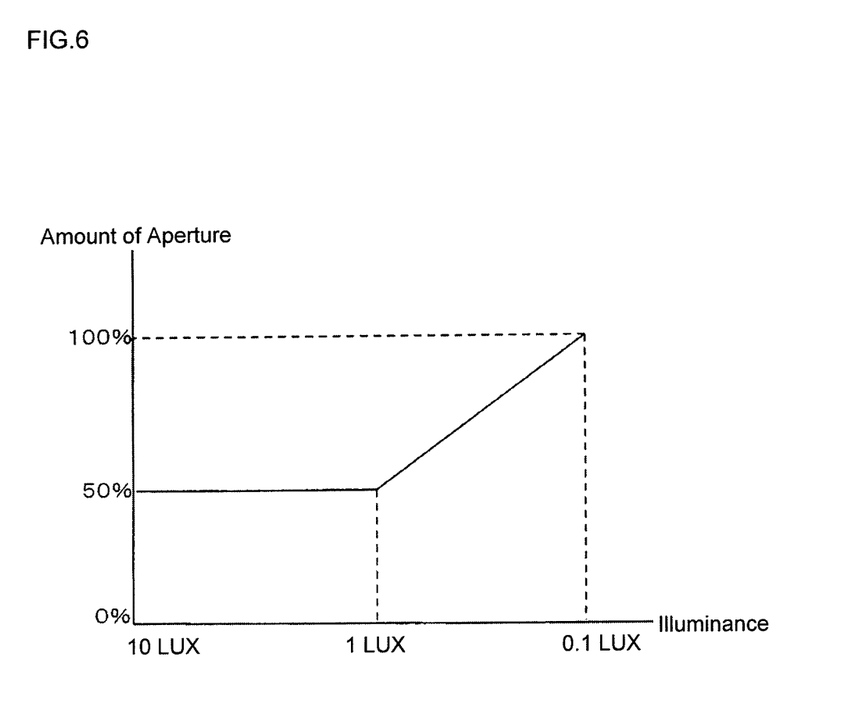
FIG. 6 is a diagram showing a relationship between an illuminance and the amount of aperture (a third reference value) according to the embodiment of the present invention.

The third reference value for the amount of aperture is set based on the illuminance of light entering the camera lens 6. The illuminance is measured by the illuminance measurement unit 11. FIG. 6 is a diagram showing a relationship between the illuminance and the third reference value for the amount of aperture. As shown in FIG. 6, the third reference value for the amount of aperture is set to become greater from a closed value (0%) toward an open value (100%) as the illuminance decreases. For example, in the example in FIG. 6, the amount of aperture is set to 50% when the illuminance is between 10 lux and 1 lux, and the amount of aperture is set to gradually increase from 50% to 100% when the illuminance is between 1 lux and 0.1 lux. Additionally, an example is described here where the amount of aperture decreases in a range where the illuminance is between 1 lux and 0.1 lux, but the range of the illuminance (the range of the illuminance where the amount of aperture is decreased) is not limited thereto. Also, in the example in FIG. 6, a case is shown where the amount of aperture linearly (in a linear function manner) changes from 50% to 100% when the illuminance is between 1 lux and 0.1 lux, but the way the amount of aperture changes is not limited thereto.

The amount of aperture is set based on the three reference values (the first reference value, the second reference value and the third reference value). Specifically, it is set to a greater value after comparing the third reference value with the smaller of the first reference value and the second reference value. For example, in the case that the first reference value is 75%, the second reference value is 50% and the third reference value is 90%, the third reference value (90%) is compared with the smaller of the first reference value and the second reference value (50%), and the amount of aperture is set to the greater (90%) of the values.

Additionally, the amount of aperture may be set based on two reference values (for example, the first reference value and the second reference value). In this case, it is set to a smaller value after comparing the first reference value with the second reference value. For example, in the case that the first reference value is 50% and the second reference value is 80%, the first reference value is compared with the second reference value, and the amount of aperture is set to the smaller (50%) of the values. Moreover, the amount of aperture may be set based on one reference value (for example, based only on the first reference value).

Figure 7:
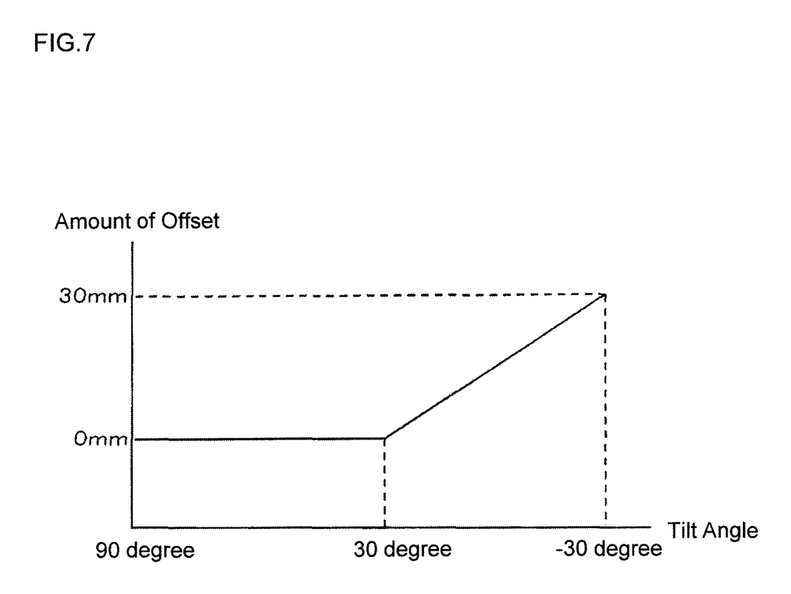
FIG. 7 is a diagram showing a relationship between the amount of offset and a tilt angle according to the embodiment of the present invention.

Next, control of the amount of offset by the dome-type camera 1 of the present embodiment will be described. The amount of offset is set based on the tilt angle of the lens unit 2 (the tilt angle of the camera lens 6). FIG. 7 is a diagram showing a relationship between the tilt angle and the amount of offset. As shown in FIG. 7, the amount of offset is set to increase from the center position (0 mm) of the dome cover 3 toward the zenith direction as the tilt angle becomes smaller. For example, in the example in FIG. 7, the amount of offset is set to 0 mm when the tilt angle is between 90 degrees and 30 degrees, and the amount of offset is set to gradually increase from 0 mm to 30 mm when the tilt angle is between 30 degrees and −30 degrees. Additionally, an example is described here where the amount of offset is increased in a range where the tilt angle is between 30 degrees and −30 degrees, but the range of the tilt angle (the range of the tilt angle where the amount of offset is decreased) is not limited thereto. Also, in the example in FIG. 7, a case is described where the amount of offset linearly (in a linear function manner) changes from 0 mm to 30 mm when the tilt angle is between 30 degrees and −30 degrees, but the way the amount of offset changes is not limited thereto.

According to the dome-type camera 1 of the embodiment of the present invention as described above, a desirable low tilt angle image with a reduced blur may be obtained even with a megapixel dome camera.

That is, in the present embodiment, when the angle of the camera lens 6 of the dome-type camera 1 in the tilt direction (the tilt angle) becomes small, the amount of aperture of the camera lens 6 is controlled to accordingly become small. When the tilt angle becomes small, the blur due to the unevenness in the thickness of the dome cover 3 becomes more noticeable, but in this case, the blur can be reduced by reducing the amount of aperture of the camera lens 6 and reducing the aberration. In this manner, a desirable low tilt angle image with a reduced blur may be obtained even with a megapixel dome camera.

Furthermore, in the present embodiment, when the zoom factor of the camera lens 6 of the dome-type camera 1 is increased, the amount of aperture of the camera lens 6 is controlled so as to accordingly become small. When the zoom factor is increased, the blur due to the unevenness in the thickness of the dome cover 3 becomes more noticeable, but in this case, the blur can be reduced by reducing the amount of aperture of the camera lens 6 and reducing the aberration. In this manner, a desirable low tilt angle image with a reduced blur may be obtained even with a megapixel dome camera. Moreover, in this case, since the amount of aperture of the camera lens 6 is set to the smaller of the first reference value set based on the tilt angle and the second reference value set based on the zoom factor, the amount of aperture can be prevented from becoming excessively small.

Furthermore, in the present embodiment, when the illuminance of light entering the camera lens 6 becomes low, the amount of aperture of the camera lens 6 is controlled so as to accordingly become great. The amount of aperture can thereby be prevented from becoming excessively small. Accordingly, a high-sensitivity image can be obtained even in a low-illumination image-capturing environment (a dark image-capturing environment).

Moreover, in the present embodiment, when the angle of the camera lens 6 of the dome-type camera 1 in the tilt direction (the tilt angle) becomes small, the amount of offset of the camera lens 6 accordingly becomes small. Therefore, a low tilt angle image whose perimeter is not darkened can be obtained.

Additionally, in the present embodiment, the amount of aperture is set to a smaller value of the first reference value and the second reference value, but in the case a negative impact on the tilt angle of the dome cover and the resolution at the zoom factor of the zoom lens is great, the amount of aperture may be set to the greater of the first reference value and the second reference value.

Heretofore, the embodiment of the present invention has been described by citing examples, but the scope of the present invention is not limited thereto, and alterations and modifications according to the object is possible within the scope described in the claims.

A preferred embodiment of the present invention that is currently conceivable has been described above, but it is to be understood that various modifications are possible with respect to the present embodiment, and every such modification within the true spirit and scope of the present invention is intended to be included in the appended claims.

INDUSTRIAL APPLICABILITY

As described above, the dome-type camera according to the present invention is useful as a surveillance camera or the like in that an effect is achieved that a desirable low tilt angle image with a reduced blur may be obtained even with a megapixel dome camera.

REFERENCE SIGNS LIST

1 Dome-type camera
2 Lens unit
3 Dome cover
4 Control unit
5 Image sensor
6 Camera lens
7 Aperture mechanism
8 Base portion
9 Aperture control unit
10 Zoom control unit
11 Illuminance measurement unit
12 Tilt control unit
13 Offset control unit

The invention claimed is:

1. A dome-type camera comprising:
a hemispherical dome cover;
a lens unit arranged at a position offset from a spherical center of the dome cover in a zenith direction;
an aperture controller that controls an aperture amount of a camera lens; and
a zoom controller that controls a zoom factor of the camera lens,
wherein a first reference value used as a reference for the aperture amount is set to become smaller from an open value toward a closed value in accordance with an angle of the camera lens in a tilt direction becoming smaller from a zenith direction of the dome cover toward a horizontal direction,
wherein a second reference value used as a reference for the aperture amount is set to become smaller from the open value toward the closed value in accordance with an increase in the zoom factor, and
wherein the aperture amount is set using the first reference value and the second reference value.

2. The dome-type camera according to claim 1, further comprising:
an illuminance meter that measures an illuminance of light entering the camera lens,
wherein a third reference value used as a reference for the aperture amount is set to become greater from the closed value toward the open value in accordance with a decrease in the illuminance, and
wherein a value that is set using the first reference value and the second reference value is compared with the third reference value, and the aperture amount is set to a greater of the value that is set using the first reference value and the second reference value, and the third reference value.

3. The dome-type camera according to claim 1, wherein the lens unit includes the camera lens.

4. An aperture control method used by a dome-type camera including a hemispherical dome cover, a lens unit arranged at a position offset from a spherical center of the dome cover in a zenith direction, an aperture controller that controls an aperture amount of a camera lens, and a zoom controller that controls a zoom factor of the camera lens, the aperture control method comprising:
detecting an angle of the camera lens in a tilt direction;
determining a first reference value used as a reference for the aperture amount, to become smaller from an open value toward a closed value in accordance with the detected angle in the tilt direction becoming smaller from the zenith direction of the dome cover toward a horizontal direction;
detecting a zoom factor;
determining a second reference value used as a reference for the aperture amount, to become smaller from the open value toward the closed value in accordance with an increase in the zoom factor; and determining the aperture amount using the first reference value and the second reference value.

5. The aperture control method according to claim 4, further comprising:
measuring an illuminance of light entering the camera lens;
determining a third reference value used as a reference for the aperture amount, to become greater from the closed value toward the open value in accordance with a decrease in the illuminance;
comparing a value determined using the first reference value and the second reference value with the third reference value; and
determining the aperture amount as a greater of the value determined using the first reference value and the second reference value, and the third reference value.

6. The aperture control method according to claim 4, wherein the lens unit includes the camera lens.

* * * * *